Feb. 1, 1944. L. E. SHAW 2,340,704
LUBRICATING DEVICE
Filed March 2, 1943

Louis Eaton Shaw
INVENTOR
BY
ATTORNEY

Patented Feb. 1, 1944

2,340,704

UNITED STATES PATENT OFFICE 2,340,704

LUBRICATING DEVICE

Louis Eaton Shaw, East Orange, N. J.

Application March 2, 1943, Serial No. 477,706

7 Claims. (Cl. 74—230.17)

This invention relates to a lubricating device, and more particularly to a novel device for lubricating a rotating shaft carried by a housing, which shaft may also be movable or shiftable longitudinally of said housing. The lubrication of the longitudinally shiftable, rotatable shaft may be accomplished through the usual method of incorporating fabric or felt packing or washers in the bearing surfaces and applying lubricating oil thereto at frequent intervals, but such a method of lubrication proves impractical because of the necessity of constant attention and frequent supply of lubricant to the packing and washers and the unavoidable possibility of providing an excess of lubricant thereto, resulting in the lubricant being thrown off by the rotating mechanism with consequent damage to surrounding parts or mechanisms which might be sprayed with the lubricant thus thrown off by the rotating parts and waste of the lubricant. Furthermore, such a method provides no assurance of a constant, steady supply of oil to the rotating parts, and the possibility of the mechanism running dry and freezing renders such a method of lubrication most undesirable.

My invention provides for a constant supply of lubricating oil to rotating parts, and insures against an over supply of lubricant with the attendant possibility of damage and waste of lubricant. By employing my device the rotating mechanism needs only infrequent attention and is provided with just the proper amount of lubricant to insure proper lubrication. Furthermore, the structure of my invention is simple and inexpensive, employing a minimum of parts and providing a maximum of efficiency. In addition the parts employed do not require frequent replacement, as is necessary when using the accepted methods of lubricating such mechanisms thus saving time required for making such replacements.

With these and other objects in view, as may appear from the accompanying specification, the invention consists of various features of construction and combination of parts, which will be first described in connection with the accompanying drawing, showing a lubricating device of a preferred form embodying the invention, and the features forming the invention will be specifically pointed out in the claims.

Figure 1:
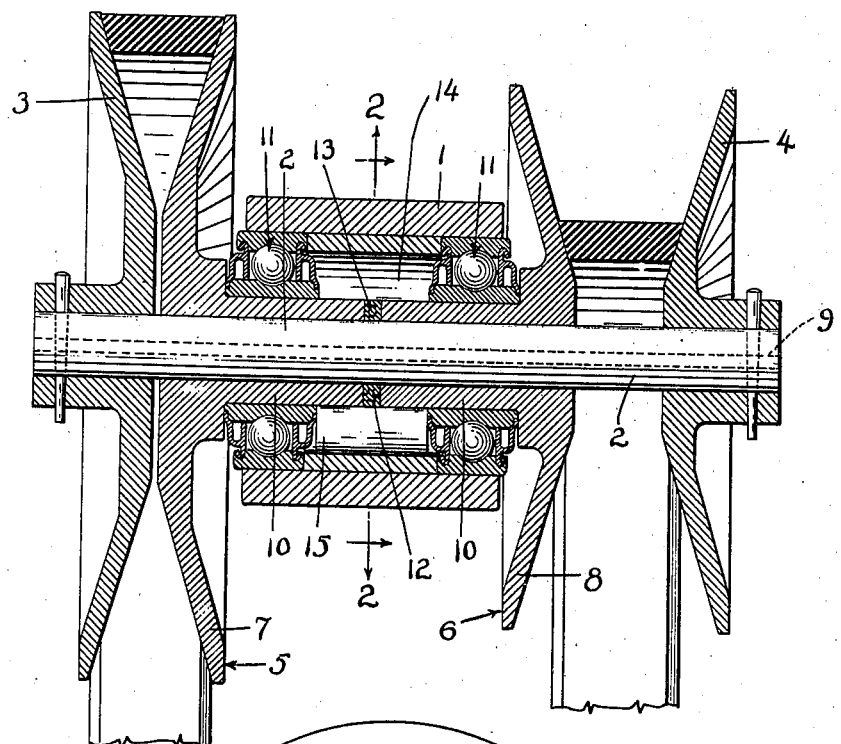
Figure 1 is a sectional view showing a bearing and shaft structure employing my improved lubrication device.
Figure 2:
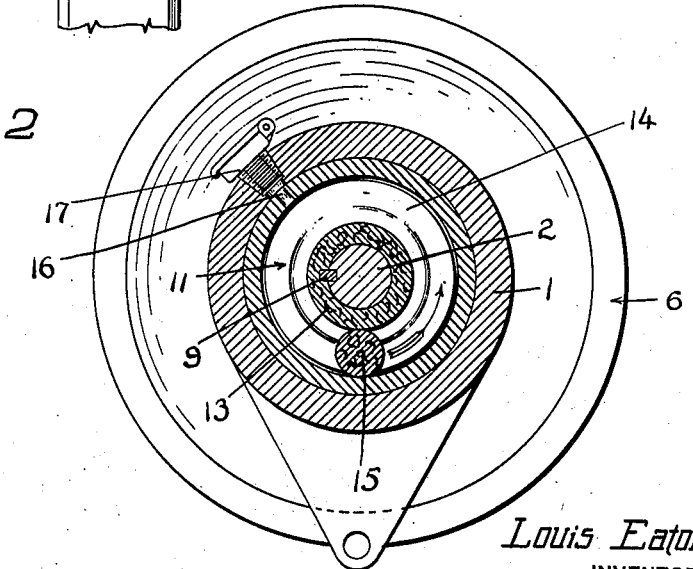
Figure 2 is a cross-sectional view taken on the line 2—2 of Figure 1.

Referring more particularly to the drawing, for purposes of illustration I have shown my novel lubricating device employed in connection with a longitudinally shiftable, rotatable jack shaft carrying a pair of variable V-belt sheaves. The jack shaft 2 is carried by a housing 1, and has mounted thereupon, at either end, the two outer sections 3 and 4 of two adjustable sheaves 5 and 6. The two outer sections 3 and 4 respectively of the adjustable sheaves 5 and 6 are carried by the shaft 2 in fixed position, being keyed and pinned thereto. The two inner sections 7 and 8 respectively of the sheaves 5 and 6 are keyed to the shaft 2 as shown at 9, and the shaft 2 is slidable therethrough for varying the width of the space between the sections of the sheaves. Sleeves 10 are formed on these inner sections 7 and 8 of the sheaves 5 and 6, extending inwardly toward each other along the shaft 2.

Bearing structures 11, of any approved type available on the market, are carried by the housing 1 and fit over the sleeves 10 to allow free rotation of the sheave sections 7 and 8 and consequently of the jack shaft 2 to which the sheave sections are keyed. A space 12 is located between the two facing ends of the sleeves 10 and about the shaft 2. A washer or ring 13 formed of any approved lubricant absorbing material, such as felt, is placed about the shaft 2 within this space 12 and has an outer diameter equal to the outer diameter of the sleeves 10, and fits snugly between the two inner faces thereof.

An annular space 14 is formed within the housing 1 between the bearings 11 and extends from the periphery of the sleeves 10 and washer 13 to the inner surface of the housing 1. Within this space 14 a roller 15 formed of a lubricant absorbing material, such as felt, is placed. This roller 15 is adapted for planetary rotation about the periphery of the sleeves 10 and washer 13, when the shaft 2 and sheaves 5 and 6 are rotated. During this planetary rotation of the roller 15 its outer surface contacts the periphery of the washer at all times.

An opening 16 is formed in the housing 1 into which an oil cup 17 is placed. Oil dropped into the cup 17 flows through the opening 16 into the annular space 14 and is picked up and absorbed by the roller 15 as it rotates about the periphery of the sleeves 10 and washer 13. The lubricant thus absorbed by the roller 15 is transmitted to the washer 13 which it contacts. The roller 15 has a slightly larger diameter than the distance between the periphery of the washer 13 to the inner surface of the housing and is thus slightly compressed when in position and as it rotates in its planetary path within the annular space 14. The oil thus fed to the washer 13 by its contact with the roller 15 is supplied to the shaft 2 as it slides or is shifted within the sleeves 10 attached to the sheave sections 7 and 8 to provide lubrication for the shaft during its shifting movement.

The roller 15 is of such a length that it contacts at its ends the bearing structures 11. These are so constructed that the oil thus transmitted to their surfaces through their contact with the roller 15 is sufficient to lubricate them properly, the oil forming a thin film over the moving parts of the bearings.

The use of the roller 15 and felt washer 13 provides oil to the moving surfaces in very minute quantities, yet in sufficient quantity to form a thin film on such surfaces providing perfect lubrication yet guarding against an over supply of lubricant which if present might seep through the bearings and along the shaft 2 through the sheave sections 7 and 8 to be thrown off by the rotating parts and coat the associated parts of the mechanism, which in this instance are the fabric or rubber V-belts. These latter could be seriously damaged by such thrown-off oil. The capillary reaction of the felt and oil guarantees this continuous feeding of minute quantities of oil to the moving surfaces, yet prevents excess feeding thereof.

Tests have shown that a structure such as described above, employing my invention, received perfect lubrication even after more than thirty million revolutions of the shaft and sheaves, and further tests proved that a mere twenty-five drops of lubricant sufficed to satisfactorily lubricate the mechanism through over one hundred thousand shifts of the shaft longitudinally of the housing and sheave sections 7 and 8, without any addition to or renewal of the oil supply at any time during such tests.

It will be understood that the invention is not to be limited to the specific construction or arrangement of parts shown, but that they may be widely modified within the invention defined by the claims.

What is claimed is:

1. In a lubricating device, a housing, a rotatable shaft extending through said housing, an absorbent lubricant carrying washer on said shaft, a lubricant carrying absorbent roller in said housing and rotatable in a planetary manner about said washer and shaft for delivering a limited quantity of lubricant to the washer for transmission to and lubrication of said shaft.

2. In a lubricating device, a housing, bearings carried by said housing, a rotatable shaft extending through said housing and bearings, a lubricant absorbing washer on said shaft, a lubricant carrying roller in said housing and rotatable in a planetary manner about the periphery of said washer for delivering lubricant to said washer for transmission to and lubrication of said shaft.

3. In a lubricating device, a housing, bearings carried by said housing, a rotatable shaft extending through said housing and bearings, a lubricant absorbent washer on said shaft, a lubricant carrying absorbent roller in said housing and rotatable in a planetary manner about the periphery of said washer for delivering lubricant to said washer in limited quantities for lubricating said shaft and bearings.

4. In a lubricating device, a housing, bearings carried by said housing, a longitudinally shiftable rotatable shaft carried by said housing and bearings, a lubricant absorbing washer about said shaft, a lubricant carrying absorbent roller within said housing adapted for planetary movement about the periphery of said washer for delivering a limited quantity of lubricant to said washer and thence to said shaft.

5. In a lubricating device, a housing, bearings carried by said housing, a longitudinally shiftable rotatable shaft carried by said housing and bearings, a lubricant absorbing washer about said shaft, an absorbent lubricant carrying roller within said housing adapted for planetary rotation about the periphery of said washer for lubricating said bearings and for delivering a limited quantity of lubricant to said washer and thence to said shaft.

6. In a lubricating device including a housing and a rotatable shaft in said housing, sleeves on said shaft, a lubricant absorbing washer about said shaft between the facing ends of said sleeves, a lubricant carrying absorbent roller within said housing adapted for planetary rotation about the peripheries of the sleeves and washer and contacting the washer for supplying a limited quantity of lubricant thereto and thence to the shaft.

7. In a lubricating device, a housing, bearings in said housing, a longitudinally shiftable rotatable shaft carried by said bearings and housing, sleeves on said shaft extending through said bearings, said shaft being shiftable longitudinally through said sleeves, a lubricant absorbing washer about said shaft between the facing ends of said sleeves, and a lubricant carrying absorbent roller within said housing adapted for planetary rotation about the periphery of said washer for delivering a limited quantity of lubricant to said washer for lubricating said shaft and to the bearings for the lubrication thereof.

LOUIS EATON SHAW.